(12) United States Patent
DiSario

(10) Patent No.: US 6,209,681 B1
(45) Date of Patent: Apr. 3, 2001

(54) LADDER CADDY

(75) Inventor: Peter DiSario, East Moriches, NY (US)

(73) Assignee: Peter DiSario-RPM Painting, East Moriches, NY (US)

( * ) Notice: Subject to any disclaimer, the term of this patent is extended or adjusted under 35 U.S.C. 154(b) by 0 days.

(21) Appl. No.: 08/932,949

(22) Filed: Sep. 17, 1997

Related U.S. Application Data

(62) Division of application No. 08/542,816, filed on Oct. 13, 1995, now Pat. No. 5,727,799.

(51) Int. Cl.[7] .................................................. B62B 1/26
(52) U.S. Cl. .............................................. 182/20; 182/127
(58) Field of Search ............................ 182/20, 116, 127; 280/47.33, 47.3, 47.31, 47.78, 47.32, 78

(56) References Cited

U.S. PATENT DOCUMENTS

| | | | |
|---|---|---|---|
| 2,416,492 | * | 2/1947 | Negley .................................. 280/47.3 |
| 2,606,771 | * | 8/1952 | Rehngerg ............................ 280/47.32 |
| 2,624,588 | * | 1/1953 | Jones .................................... 280/47.3 |
| 2,746,628 | * | 5/1956 | Neyra .................................... 182/127 |
| 3,387,859 | * | 6/1968 | McClellan ............................... 280/78 |
| 3,567,241 | * | 3/1971 | Foschino ............................ 280/47.32 |
| 4,049,283 | * | 9/1977 | Brooks ............................. 280/47.131 |
| 4,288,087 | * | 9/1981 | Morrison ............................ 280/47.32 |
| 4,579,357 | * | 4/1986 | Webster ........................... 280/47.331 |
| 5,368,325 | * | 11/1994 | Hazen .................................... 280/78 |

FOREIGN PATENT DOCUMENTS

| | | | |
|---|---|---|---|
| 382419 | * | 2/1908 | (FR) ..................................... 182/20 |
| 615227 | * | 12/1926 | (FR) .................................. 280/47.32 |

* cited by examiner

Primary Examiner—Alvin Chin Shue
(74) Attorney, Agent, or Firm—John Q. McQuillan

(57) ABSTRACT

The disclosure relates to a dolly for supporting a ladder during movement of the ladder to a work site. The dolly has a frame which is adapted to be attached by clips to the rungs of the ladder. The dolly has a single relatively large wheel in terms of the width of the ladder pivotally mounted on the frame for providing a rolling support for the ladder and to enable a single individual to move a long heavy ladder conveniently into position for use at a work site. The dolly is especially useful when moving a ladder, especially a heavy ladder such as an extension ladder, over sloping or rough ground to a work site.

14 Claims, 4 Drawing Sheets

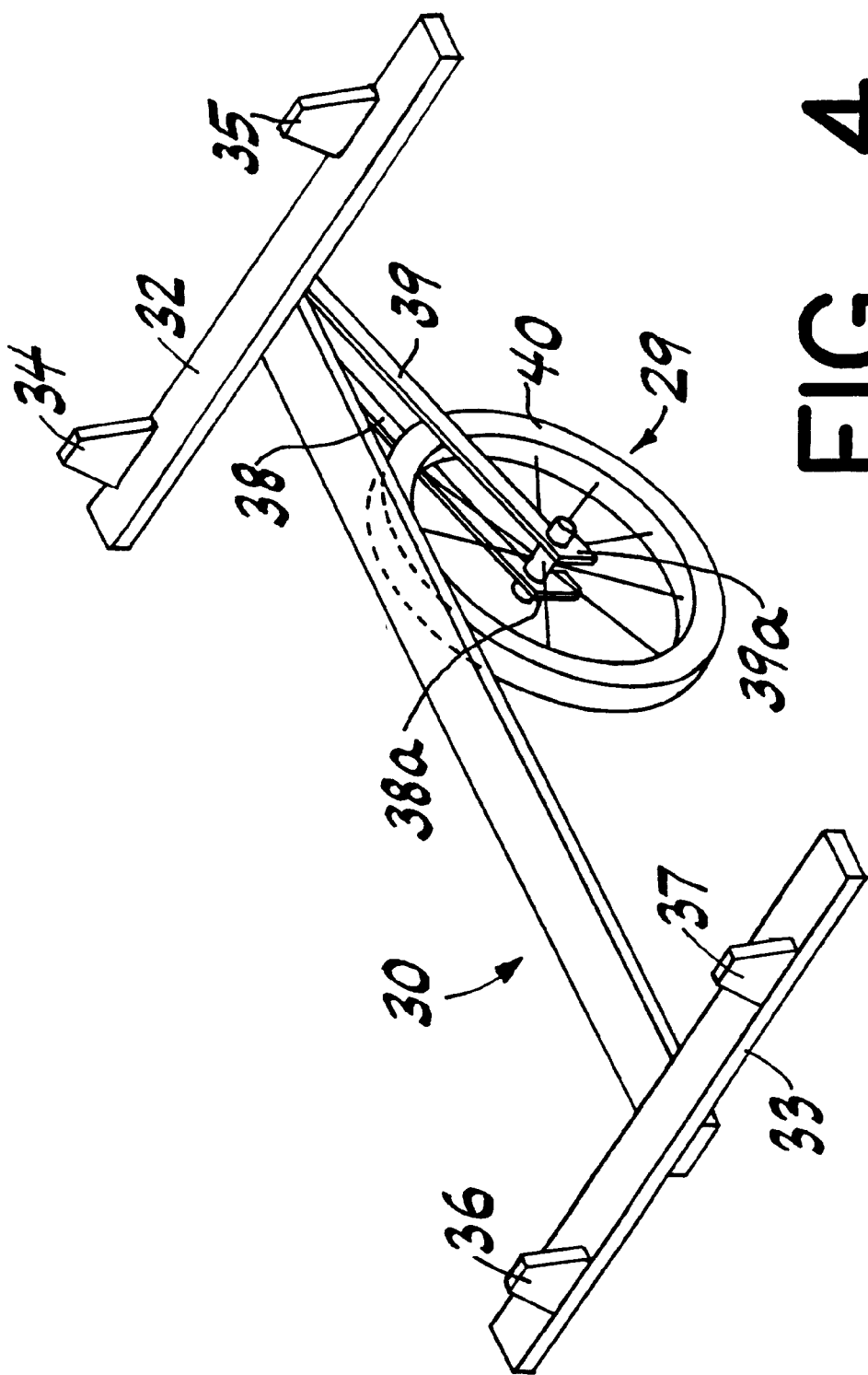

LADDER CADDY

This application is a division of 08/542,816 filed Oct. 13, 1995 now Pat. No. 5,727,799.

BACKGROUND OF THE INVENTION

1. Field of the Invention

This invention relates generally to a wheel device or caddy which supports a ladder and enables one individual to move the ladder, especially where the ladder is a heavy and long ladder such as an extension ladder.

2. Description of the Prior Art

U.S. Pat. No. 4,564,203, issued on Jan. 14, 1986, shows a single small wheel pivotally mounted on one end of a step ladder.

U.S. Pat. No. 4,049,283, issued on Sep. 20, 1977, (based upon U.S. Pat. No. 3,991,852, issued Nov. 16, 1976) shows a ladder caddy which has a support using one pair of upright legs and a pair of small wheels.

U.S. Pat. No. 3,596,922, issued on Aug. 3, 1971, shows a utility cart with a single small wheel.

U.S. Pat. Nos. 3,074,507, issued Jan. 22, 1963, 4,009,762, issued Mar. 1, 1977, and 5,086,872, issued Feb. 11, 1992, each show multiple small wheel devices for supporting ladders.

SUMMARY OF THE INVENTION

The present invention comprises a dolly for supporting a ladder during movement of the ladder to a work site. The dolly has a frame which is adapted to be attached by clips to the rungs of the ladder. The dolly has a single comparatively large wheel in terms of the width of a ladder to be mounted on the frame of the dolly for providing a rolling support to the ladder and to enable a single individual to move a long heavy ladder conveniently into position for use at a work site. The dolly is especially useful when moving a ladder, especially a heavy ladder, over sloping or rough ground.

Thus an object of the invention is to provide a single wheel dolly or a rolling support for a ladder to enable the ladder, especially a heavy ladder, to be moved conveniently from one location to another, such as to a work site.

It is another object of the invention to provide a single wheel dolly for rollingly supporting a ladder during movement thereof by one individual.

BRIEF DESCRIPTION OF THE DRAWINGS

FIG. 4 is an isometric view of still another embodiment of the caddy of the invention; and FIG. 5 is a composite view showing a ladder supported by the caddy of the invention being moved from a substantially horizontal position to a substantially vertical position against a wall.

DETAILED DESCRIPTION OF THE PREFERRED EMBODIMENTS

Figure 1:
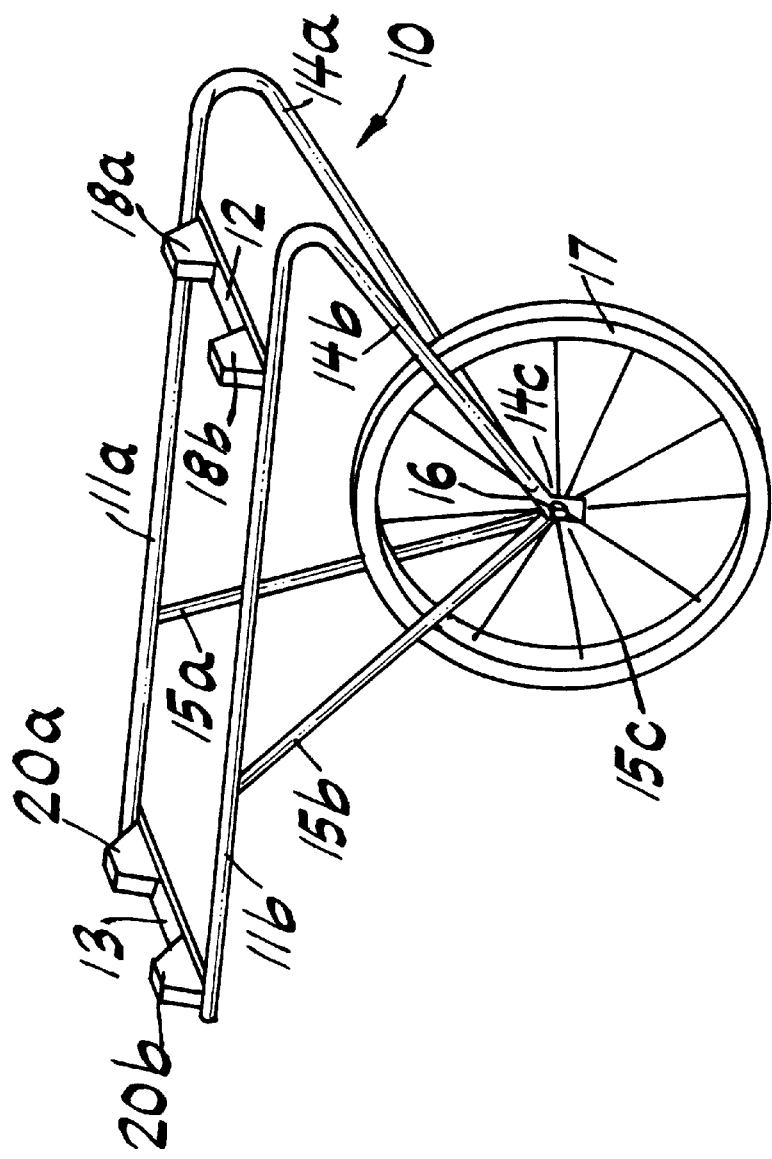
FIG. 1 is an isometric view of the caddy of the invention for transporting a ladder.

As shown in FIG. 1, caddy 10 of the invention comprises a frame 11 having a pair of longitudinal members 11a and 11b and a pair of transverse members 12 and 13, each connected at the opposite end portions thereof to the longitudinal members. Thus the two longitudinal members 11a and 11b and transverse members 12 and 13 form a rectangular shaped frame 11.

As shown in FIG. 1, the caddy 10 includes a longitudinal support members 14a and 14b which are V-shaped in form with the upper end portion of each of the support members 14a and 14b connected to the longitudinal members 11a and 11b. Support members 15a and 15b also in a V-shaped form have their upper end portions attached to the longitudinal support members 11a and 11b, respectively. The apex 14c of the V-shaped support members 14a and 14b is connected to apex 15c of support members 15a and 15b.

At the location of apices 14c and 15c which are joined together, there is pivotally mounted axle 16 of wheel 17. The diameter of wheel 17 is comparatively large is terms of a length of each of the transverse members 12 and 13. The upper portion of wheel 17 spaced apart from frame 11.

Figure 2:
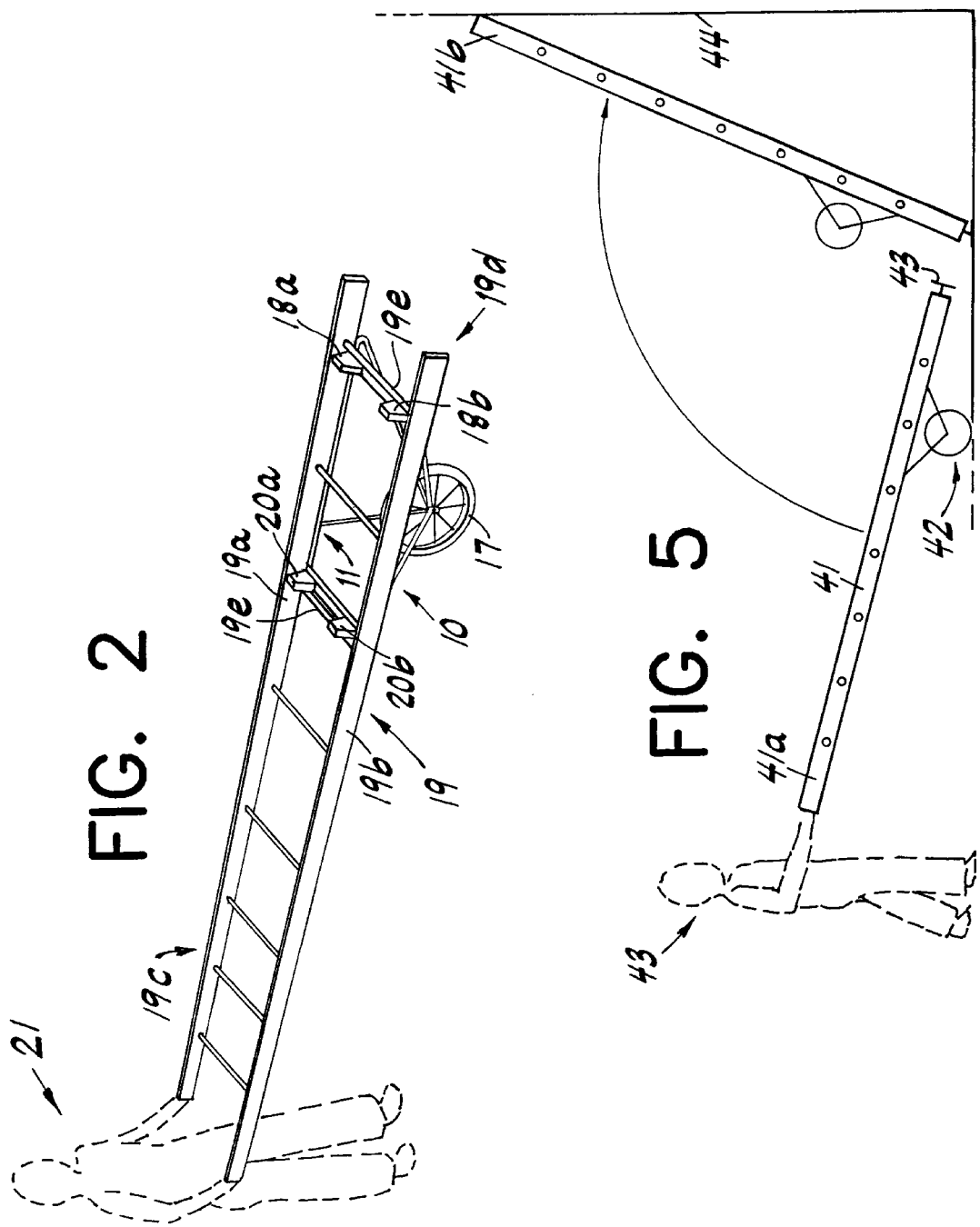
FIG. 2 is an isometric view showing a ladder supported by the caddy of the invention and being directed by an individual user.

On transverse member 12 there is mounted a pair of clips or lugs 18a and 18b spaced apart along the transverse member with the interval between the portions of the clips adjacent the longitudinal members 11a and 11b being less than the spacing between the side rails of ladder 19 shown in FIG. 2. Thus clips 18a and 18b as shown in FIG. 2 can extend between side rails 19a and 19b of ladder 19 when the ladder is placed upon frame 11 of the caddy 10.

As shown in FIG. 1 transverse member 13 is provided with a pair of clips or lugs 20a and 20b which are positioned on the transverse member in a manner similarly to that of clips 18a and 18b on transverse member 12. Accordingly as shown in FIG. 2, clips 20a and 20b can extend between the side rails 19a and 19b of ladder 19 when the ladder is placed upon caddy 10.

In FIG. 2 there is shown a human operator 21 who can support the base end portion 19c of the ladder 19 when the ladder is resting upon caddy 10 at the upper end or top end 19d of the ladder. The configuration shown in FIG. 2 of ladder 19 having its upper end portion 19d resting upon caddy 10 enables the operator 21 to manipulate and direct the ladder in the manner similar to an operator manipulating or directing a wheelbarrow. Thus the operator can grip the side rails 19a and 19b of the ladder 19 and advance the ladder resting upon the caddy in the manner of advancing a wheel barrow. Furthermore, the operator can by applying lateral force to side rails 19a and 19b to cause the path of travel of the caddy to change, again in the manner of turning a wheel barrow. Thus the provision of the single wheel 17 to caddy 10 and the comparatively large size of wheel 17 enable the operator to advance the ladder supported by the caddy over a rough surface or an inclined surface, that is the ground surface underlying the site to which the operator is to deliver the ladder.

It can be seen in FIG. 2 that the clips 18a and 18b and 20a and 20b are adapted to engage rungs 19e of the ladder 19 in order that the caddy is fixed with respect to a given location along the length of the side rails 19a and 19b of the ladder 19. If desired and in order to reduce the vertical load of the ladder to be supported by the operator, caddy 10 can be moved in a direction toward the center of ladder 19, thereby placing more weight of the ladder on the caddy.

Figure 3:
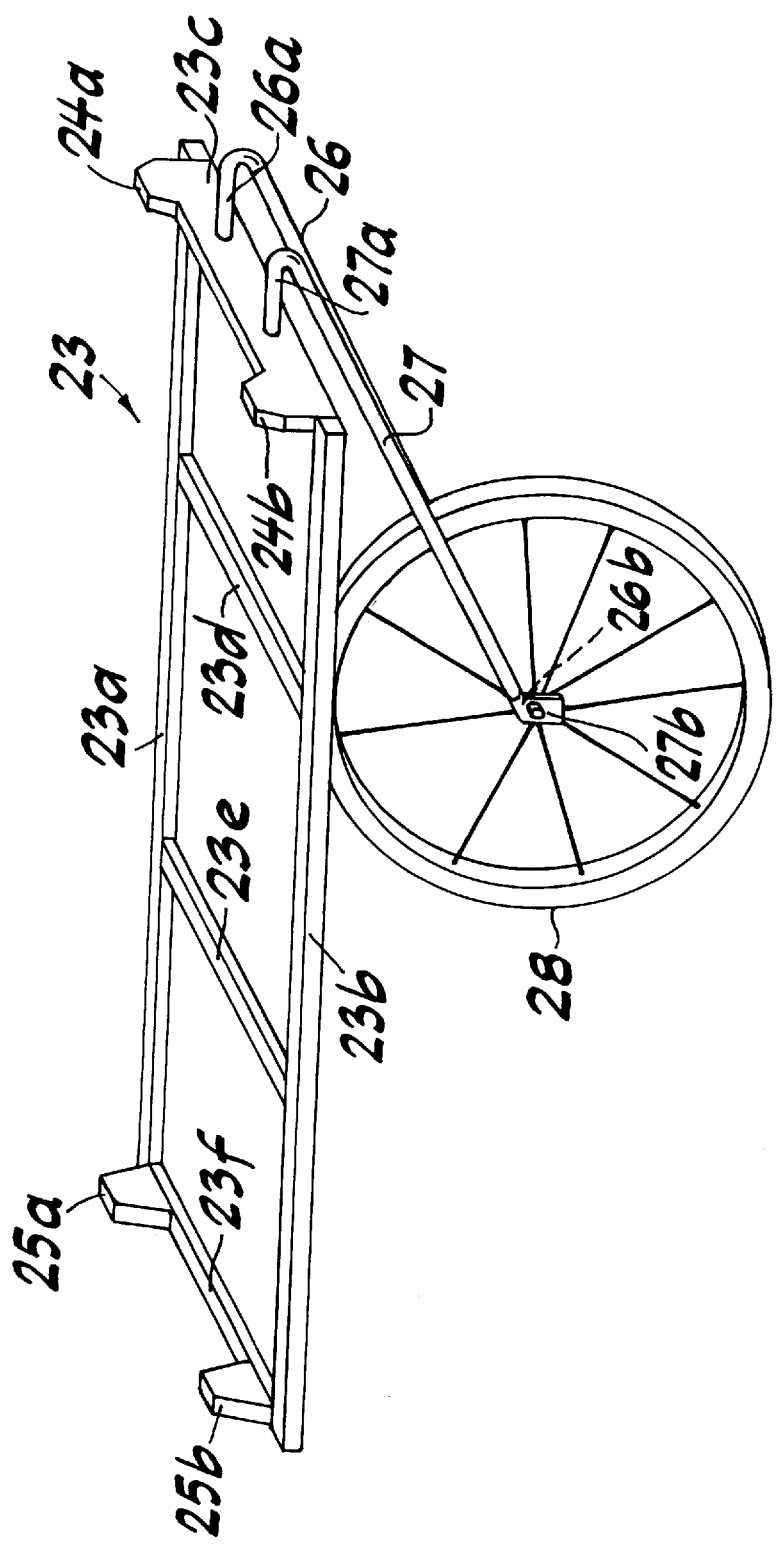
FIG. 3 is an isometric view of another embodiment of the caddy of the invention.

In FIG. 3 there is shown another embodiment of the caddy of the invention, caddy 22, having frame 23 which has longitudinal members 23a and 23b and transverse members 23c, 23d, 23e, and 23f. Clips or lugs 24a and 24b are disposed upon transverse member 23c and spaced apart to enable the clips to extend between side rails of a ladder when the ladder is placed upon caddy 22. Similarly clips or lugs 25a and 25b are disposed upon transverse member 23f and are spaced apart to extend between the side rails of a ladder.

When a ladder is placed upon caddy 22, clips 24a and 24b and 25a and 25b are adapted to engage the rungs of the ladder.

As shown in FIG. 3 elongated support members 26 and 27 are in a V-shaped form with spaced end portion 26a and 27a attached to transverse member 23c. The lower end portions of the support members, portions 26b and 27b, are joined at the apex of the V-shaped support members. At the apex there is pivotally mounted wheel 28 which at its upper portion is adapted to clear frame 23.

Thus it can be seen in FIG. 3 that caddy 22 by simply employing one pair of support members 26 and 27 in V-shaped form is more compact than caddy 10 shown in FIG. 1 which employs two pairs of support members 14a, 14b and 15a and 15b. In addition the cantilever construction of support members 26 and 27, as shown in FIG. 3, introduces a resilient or spring-like property to caddy 23 which improves the handling of the caddy for supporting a ladder, especially when traversing a rough or irregular surface or ground.

In FIG. 4 there is shown still another embodiment of the caddy of the invention, caddy 29. Caddy 29 includes a frame 30 comprising a single longitudinal member 31 and a pair of transverse members 32 and 33. Spaced apart on transverse member 32 are clips 34 and 35 while on transverse member 33 there are disposed clips 36 and 37. The interval between the clips in the direction of the transverse member enables the clips to be disposed between the side rails of a ladder to be carried by caddy 29 with the clips engaging and securing the rungs of the ladder adjacent thereto.

Caddy 29 includes a pair of elongated support members 38 and 39 which are attached at the upper end thereof to transverse member 32. The lower portions of 38a and 39a of the elongated support members are joined together to provide a pivotally support for wheel 40. The construction of elongated support members 38 and 39 as result of being attached to transverse member 32 provides a resilience residence or flexibility to the support of wheel 40, thereby improving the handling of the caddy over a rough or irregular surface.

In FIG. 5 there is shown ladder 41 supported by a caddy 42 which can be a caddy of any of the embodiments of the invention. As viewed in the left of FIG. 5, the operator 43 is preparing to elevate the end 41a of the ladder 41 with the footings 43 of the ladder in contact with a ground surface. Thereafter the operator can pivot ladder 41 with caddy 42 attached thereto until the upper end portion 41b is brought to a position against vertical wall 44.

It should be noted that the caddies 22 of FIGS. 3 and 29 of FIG. 4 can be positioned with respect to a ladder with the elongated support members either sloping toward or away from the center portion of a ladder to be supported thereon. When sloping away the center portion of a ladder, elongated support members 26 and 27 of caddy 22 and elongated support members 38 and 39 of caddy 29 enable the elongated support members to act as casters for the wheel of the caddy, thereby facilitating the steering of a ladder on the caddy by the operator.

What is claimed is:

1. A hand-propelled caddy for transporting a ladder when the ladder is disposed on the caddy, the ladder having rungs extending parallel to and spaced apart from one another between a pair of spaced apart side rails, the caddy comprising:

an elongated frame extending longitudinally between a forward and rearward end portion of the caddy and including at least one longitudinal member, the length of the at least one longitudinal member having a length capable of spanning not more than being equal to at least a single multiple of the spacing between two adjacent rungs of a ladder to be transported, and the elongated frame further including a plurality of transverse members mounted spaced apart from one another along the length of the at least one longitudinal member and extending transversely with respect thereto for a predetermined distance, the predetermined distance capable of spanning a distance corresponding to the outside width of the spaced apart side rails of a ladder to be disposed on the caddy to be transported, a transverse member of the plurality of transverse members being disposed adjacent each of the opposite end portions of the at least one longitudinal member of the elongated frame, a pair of clips mounted on the upper surface of each transverse member of the elongated frame disposed adjacent each of the opposite longitudinal end portions of the at least one longitudinal member of the elongated frame, the clips in each pair being spaced apart at an interval to be a distance to engage a rung between the spaced apart side rails of a ladder to be disposed on the caddy to be transported by the caddy, the pairs of clips being adapted to be disposed between the spaced apart side rails of a ladder when the ladder to be transported is placed on the upper surface of each of the transverse members of the elongated frame, a single wheel having a diameter which is at least a substantial fraction of the length of a transverse member of the elongated frame, and the caddy consisting of a single pair of elongated support members each underlying the elongated frame and having an upper end connected at a forward end of the elongated frame, each support member being at an acute angle with respect to the elongated frame and each having an opposite lower end, the single wheel being pivotally mounted solely on the opposite lower ends of the single pair of elongated support members on an axis extending transversely with respect to the at least one longitudinal member of the elongated frame with the periphery of the wheel spaced apart from the elongated frame, the wheel enabling movement of the elongated frame when supporting a ladder to be disposed on the elongated frame with the rungs of the ladder when disposed on the elongated frame being in engagement with the pairs of clips thereon to secure the ladder on the elongated frame.

2. A caddy in accordance with claim 1 in which each of the clips are tapered with respect to the transverse member with the narrower portion of each tapered clip being opposite to the transverse member.

3. A caddy in accordance with claim 1 in which the single pair of elongated support members are V-shaped to form an apex with the apex of the V-shape being disposed opposite to the frame, the wheel being pivotally mounted at the apex.

4. A caddy in accordance with claim 1 in which the single pair of elongated support members are disposed substantially in lateral alignment to one another.

5. A caddy in accordance with claim 1 in which the single pair of elongated support members extending at an acute angle with respect to the frame and underlying the frame have a spring-like property which is provided to the support of the wheel pivotally mounted thereon to facilitate steering of the caddy when transporting a ladder thereon.

6. A caddy in accordance with claim 1 in which the frame comprises a single longitudinal member with a transverse member centrally disposed at each of the opposite end portions of the longitudinal member.

7. A caddy in accordance with claim 1 in which the wheel has a diameter substantially corresponding to the length of a transverse member.

8. In combination a ladder and a hand-propelled caddy with the ladder disposed upon the caddy for transporting the ladder, the combination comprising:

a ladder having a pair of spaced apart side rails and a plurality of rungs extending parallel to and spaced apart from one another between the pair of side rails, and a caddy having an elongated frame extending longitudinally between a forward and rearward end portion thereof and including at least one longitudinal member, the length of the at least one longitudinal member being equal to at least a single muiltple of the spacing between two adjacent rungs of the ladder, and a plurality of transverse members mounted spaced apart from one another along the length of the at least one longitudinal member and extending transversely with respect thereto for a predetermined distance at least corresponding to the outside width of the spaced apart side rails of the ladder, a transverse member of the plurality of transverse members being disposed adjacent each of the opposite end portions of the at least one longitudinal member of the elongated frame, a pair of clips mounted on the upper surface of the transverse members, disposed adjacent each of the opposite longitudinal end portions of the at least one longitudinal member of the elongated frame the clips in each pair being spaced apart at an interval corresponding to a distance which is less then the spacing between the spaced apart side rails of the ladder to enable each of the pairs of clips to be disposed between the side rails of the ladder when the ladder is placed on the upper surface of each transverse member of the elongated frame of the caddy, a single wheel having a diameter which is at least a substantial fraction of the length of a transverse member of the elongated frame, and the caddy consisting of a single pair of elongated support members each underlying the elongated frame and having an upper end connected as a forward end of the elongated frame, each support member being at an acute angle with respect to the elongated frame and each having an opposite lower end, the single wheel being pivotally mounted solely on the opposite lower ends of the single pair of elongated support members on an axis extending transversely with respect to the longitudinal member of the frame with the periphery of the wheel spaced apart from the elongated frame, the wheel enabling movement of the elongated frame with the ladder disposed on the frame and the rungs of the ladder in engagement with the clips thereon to secure the ladder on the frame.

9. The combination in accordance with claim 8 in which each of the clips are tapered with respect to the transverse member with the narrower portion of each tapered clip being opposite to the transverse member.

10. A caddy in accordance with claim 8 in which the single pair of elongated support members are V-shaped to form an apex with the apex of the V-shape being disposed opposite to the frame, the wheel being pivotally mounted at the apex.

11. A caddy in accordance with claim 8 in which the single pair of elongated members are disposed substantially in lateral alignment to one another.

12. A caddy in accordance with claim 8 in which the single pair of elongated members extending at an acute angle with respect to the frame and underlying the frame have a spring-like property which is provided to the support of the wheel pivotally mounted thereon to facilitate steering of the caddy when transporting a ladder thereon.

13. A caddy in accordance with claim 8 in which the frame comprises a single longitudinal member with a transverse member centrally disposed at each of the opposite end portions of the longitudinal member.

14. A caddy in accordance with claim 8 in which the wheel has a diameter substantially corresponding to the length of a transverse member.

* * * * *